(12) United States Patent
Goodbread et al.

(10) Patent No.: US 11,781,961 B1
(45) Date of Patent: Oct. 10, 2023

(54) METHOD AND DEVICE FOR MONITORING TRANSFORMATION PROCESSES OF FLUIDS

(71) Applicant: RHEONICS GMBH, Winterthur (CH)

(72) Inventors: Joseph H. Goodbread, Winterthur (CH); Sunil Kumar, Winterthur (CH); Klaus Haeusler, Zurich (CH)

(73) Assignee: RHEONICS GMBH, Wintherthur (CH)

( * ) Notice: Subject to any disclaimer, the term of this patent is extended or adjusted under 35 U.S.C. 154(b) by 326 days.

(21) Appl. No.: 17/214,624

(22) Filed: Mar. 26, 2021

Related U.S. Application Data

(60) Provisional application No. 62/994,971, filed on Mar. 26, 2020.

(51) Int. Cl.
| | |
|---|---|
| *G01N 11/16* | (2006.01) |
| *G01N 29/24* | (2006.01) |
| *G01N 29/036* | (2006.01) |

(52) U.S. Cl.
CPC .......... *G01N 11/16* (2013.01); *G01N 29/036* (2013.01); *G01N 29/24* (2013.01)

(58) Field of Classification Search
CPC ....... G01N 11/16; G01N 29/036; G01N 29/24
See application file for complete search history.

(56) References Cited

U.S. PATENT DOCUMENTS

| | | | |
|---|---|---|---|
| 3,714,815 A | 2/1973 | Hartert | |
| 4,202,204 A | 5/1980 | Hartert | |
| 4,312,217 A | 1/1982 | Hartert | |
| 5,830,127 A * | 11/1998 | DeCastro | ............... A61B 1/122 |
| | | | 600/153 |
| 6,494,079 B1 * | 12/2002 | Matsiev | ................. G10K 11/02 |
| | | | 73/61.79 |

\* cited by examiner

*Primary Examiner* — Tarun Sinha
(74) *Attorney, Agent, or Firm* — Kolitch Romano Dascenzo Gates LLC

(57) ABSTRACT

A method for measuring the fluid properties of a sequence of fluids, including at least a first fluid and a second fluid. The methods utilize a monitoring assembly, having a fluid-properties measurement device that includes a resonator, and a set of resonator extensions, each one adapted to attach to the resonator in a manner such that the resonator's response to excitation is affected by immersion of the resonator extension. In the method a first one of the resonator extensions is attached to the resonator and the fluid-properties measurement device is used to measure at least one fluid property of the first fluid. Then he first one of the resonator extensions is removed from the resonator and a second one of the resonator extensions is attached to the resonator. Finally, the fluid-properties measurement device is used to measure at least one fluid property of the second fluid.

17 Claims, 10 Drawing Sheets

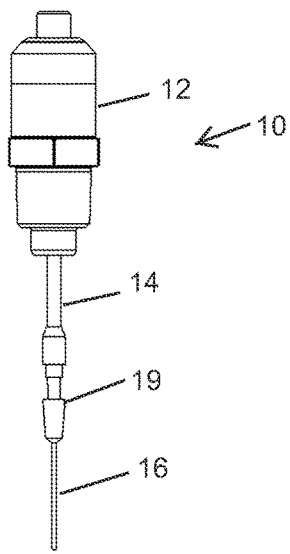 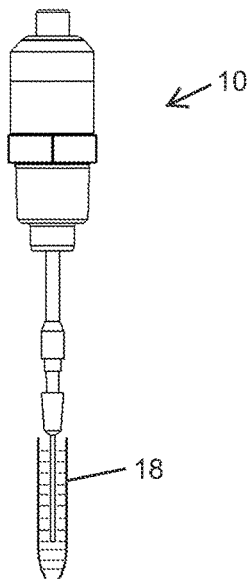
Fig. 1a
Fig. 1b
(a) Longitudinal velocity; and (b) attenuation measured at 2 MHz during the isothermal cure of an unsaturated polyester resin at 30 °C.
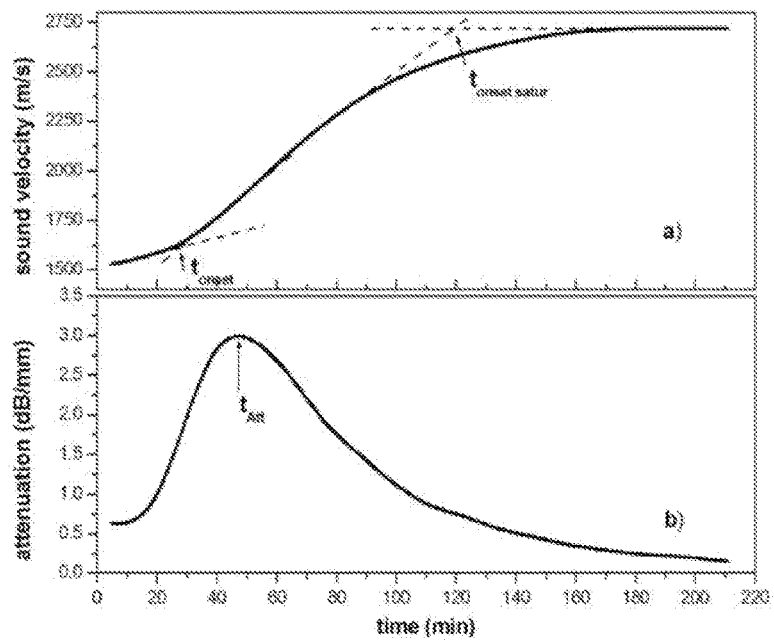
Fig. 2

 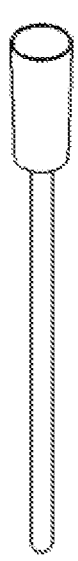 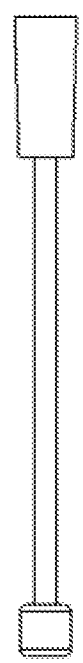 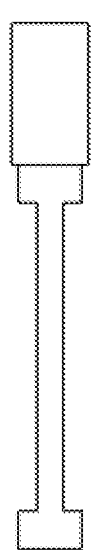 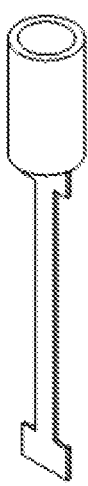 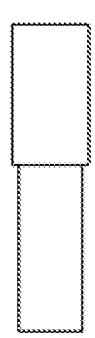 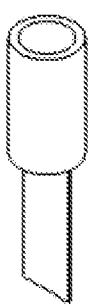
Fig. 8a     Fig. 8b     Fig. 8c

METHOD AND DEVICE FOR MONITORING TRANSFORMATION PROCESSES OF FLUIDS

CROSS-REFERENCE TO RELATED APPLICATIONS

This application claims priority from provisional patent application 62/994,971, filed Mar. 26, 2020, and which is incorporated by reference as if fully set forth herein.

BACKGROUND OF THE INVENTION

An important area of interest in adhesives, sealants, casting resin and composite materials is monitoring the degree of cure of adhesives and resins. This is important in adhesive applications for determining whether a particular batch of material has achieved the necessary mechanical properties, rather than just relying on manufacturers' specifications and adjustment of process parameters. It is important in molding operations to determine when it is safe to de-mold the cured part, and in composite manufacturing to determine when a laminated part is fully cured.

This is an aspect of a broader range of problems in which it is difficult to monitor a physical property of any fluid which, for one of a number or reasons, tends to adhere to, contaminate, corrode or otherwise damage any solid element that comes into contact with the fluid. This can include such considerations as:

- Maintenance of sanitary conditions, such as when a sanitary substance, such as a pharmaceutical or foodstuff must be monitored but wherein any instrument contacting the sanitary substance must be sterile to avoid contamination;
- Monitoring of materials through a phase change that is inherently destructive to the sensing element, such a polymerizing resins, concrete, or other adhesive materials that are difficult, costly, or hazardous to remove from a sensor
- Monitoring of materials for their corrosive action or susceptibility to corrosion,
- Monitoring of fluids for their tendency to deposit materials on immersed surfaces, or for particular materials to attract such deposits from particular fluids. In cases where the deposits are particularly tenacious, being difficult or time-consuming to remove from a sensor's surface, or difficult to remove without damage to the sensor;

In the following disclosure, it is understood that the terms "degree of cure" or "curable material", while specifically referring to materials such as resins, adhesives and sealants, are also understood to refer in a broader sense to any material for which there is a reason to monitor the physical properties during a physical transformation, but that have one of the above-noted problems, that makes it harmful, difficult or expensive to touch the material with a resonator. Also, a process that concludes with a hardening or solidification of the fluid being tested can be difficult to monitor, because such hardening tends to block the movement of the resonator. As a consequence, transformational process, particularly those that end with a hardening of the substance undergoing transformation, are often performed "open loop" without time information showing speed of onset of transformation, or progress during transformation, which may provide information concerning the completeness and quality of the eventual transformed product, and as to when the transformational process is nearing an end point.

Many methods have been published for monitoring degree of cure, but most rely on indirect measurements, such as of electrical or optical characteristics, rather than direct measurement of mechanical properties. Experimental ultrasound methods in the megahertz range are available, but these tend to be limited to very small samples in closely controlled conditions, since attenuation of ultrasound waves can be quite large during curing processes. Also, ultrasound measurements are typically conducted in the range of megahertz frequencies, which for non-Newtonian materials, may not reflect their behavior at strain rates closer to those found in their real-world applications.

Although many instruments are available that can test the beginning of a transition in physical characteristics of a material, such as the onset of cure of a laminating resin, these instruments tend to be expensive and delicate, and can be severely damaged or even rendered unusable if the curing process proceeds to full hardening of the material. Rheometers and rotational viscometers are particularly susceptible to this sort of damage, as are vibrational instruments that have delicate sensing elements such as vibrating reeds or thin rods that are part of the sensing element itself. More robust vibrational instruments may be damaged if they need to be extracted from a hardened mass, or at least will be unavailable for further tests until they have gone through a long and tedious cleaning procedure, as may be the case with particularly tenacious thermosetting resins. Furthermore, existing vibrational measurement instruments have only a single measurement element geometry. Accordingly, if one wishes to measure two different substances, where the measurements are optimized by mutually differentiated measurement element geometries, one must purchase two different measurement instruments.

SUMMARY OF INVENTION

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a method for measuring the fluid properties of a sequence of fluids, including at least a first fluid and a second fluid. The methods utilizes a monitoring assembly, having a fluid-properties measurement device that includes a resonator, and a set of resonator extensions, each one adapted to attach to the resonator in a manner such that the resonator's response to excitation is affected by immersion of the resonator extension, without the resonator itself being immersed. In the method a first one of the resonator extensions is attached to the resonator and the fluid-properties measurement device is used to measure at least one fluid property of the first fluid. Then the first one of the resonator extensions is removed from the resonator and a second one of the resonator extensions is attached to the resonator. Finally, the fluid-properties measurement device is used to measure at least one fluid property of the second fluid.

In a second separate aspect, the present invention may take the form of a fluid-properties measurement device, that has a resonator and a resonator extension coupled to the resonator by a quick release coupling.

In a third separate aspect, the present invention may take the form of a method of monitoring a physical transformation of a fluid that utilizes a fluid-properties measurement device, having an outwardly projecting resonator portion and which, when in use, produces fluid property readings. In the method, the outwardly projecting resonator portion is introduced into the fluid contemporaneously to the onset of the physical transformation, and the fluid property readings are monitored during the physical transformation.

BRIEF DESCRIPTION OF DRAWINGS

Various embodiments of the invention are disclosed in the following detailed description and accompanying drawings.

FIG. 1a is a side view of a fluid-properties measurement device, according to the present invention.

FIG. 1B is a side view of the fluid-properties measurement device of FIG. 1, having its distal end dipped into fluid in a test tube.

FIG. 2 is a pair of charts showing ultrasound velocity and attenuation for an isothermal cure of an unsaturated polymer.

FIG. 8a shows a set of rod or tube type resonator extensions.

FIG. 8b shows a set of rod or tube with bob type resonator extensions.

FIG. 8c shows a set of leaf spring resonator extensions.

DETAILED DESCRIPTION AND EMBODIMENTS

Figure 3:
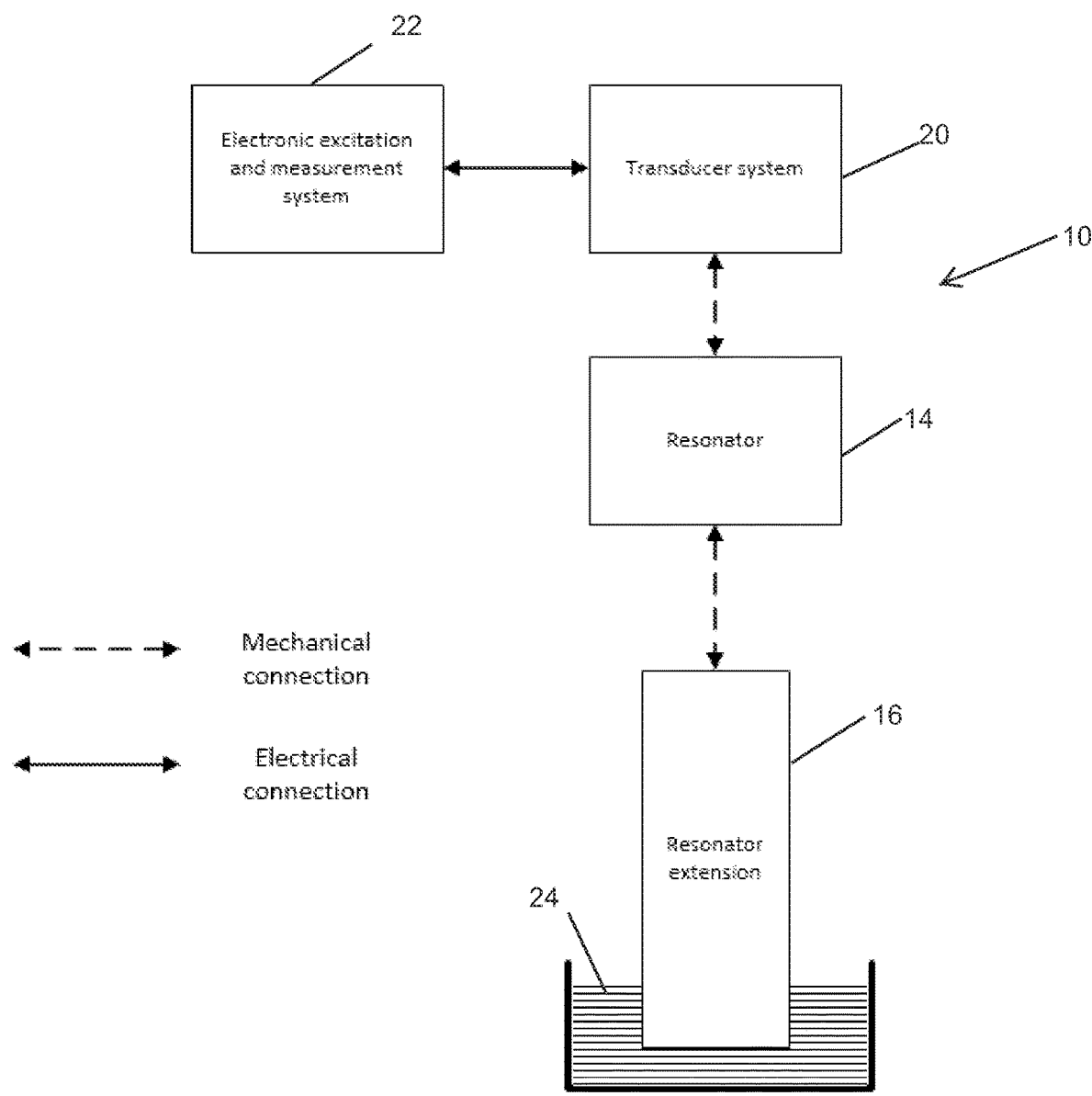
FIG. 3 is a block diagram of the fluid-properties measurement device of FIG. 1, having its distal end dipped into fluid.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Definitions: A "quick release coupling" in the context of this application is a coupling that can be coupled and decoupled with a motion of a user's hand or an analogous mechanical, possibly automated, mechanism, without the need to disassemble the resonator to which the extension is coupled. A quick release coupling, for example, can be coupled together by simply placing one part (for example a receptive part) onto another part (for example an insertive part). In another example, a receptive part of the coupling might be placed onto an insertive part, and rotated, and then perhaps, pushed on further. One example of "quick release couplings" are the Luer and Luer lock coupling used to a hypodermic needle onto a syringe. In a sequence of uses, each use could be separated in time from the previous use by minutes, hours, days, weeks, months or years. When an item is disposed of, in the context of this application, it is placed in a container or area that holds items that are designated to not be used again. The term "physical transformation" is inclusive of a chemical and/or biological transformation. A resonator extension is a compliant element connected to the resonator, and which is at least partially immersed in the fluid to be monitored; with the resonator itself generally not contacting the fluid to be monitored.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

To assist the description of the scope and its components the coordinate terms "proximal" and "distal" are used to describe the disclosed embodiments. The terms are used consistently with the description of the exemplary applications and reference portions of the device that are closer to or in the fluid being measured, during use, being more distal, and those further away from the fluid being measured being more proximal.

Referring to FIG. 1a in a preferred embodiment a fluid-properties measurement device 10 includes a body 12, an outwardly projecting resonator 14 (only partially shown in FIG. 1A) and a resonator extension 16. FIG. 1B shows device 10 measuring properties of fluid in a test tube 18. Extension 16 is coupled to resonator 14 by a Luer taper fitting 19, which may be a Luer lock fitting. This type of fitting is used to fit a hypodermic needle to a syringe and provides a secure coupling that may be effected by a quick motion on the part of a user and decoupled with a similar quick motion as easily. As noted above, a Luer or Luer lock fitting is one example of a "quick-release coupling." In a different topology, a "resonator assembly" may include both resonator 14 and extension 16 or could be a single resonator that does contact fluid under measurement.

Turning now to the methods of the present invention, these comprise using a mechanical resonator to measure:
  Curing of sealants and adhesives to evaluate the progress and quality of the transformation
  Drying and/or curing of coatings;
  Curing of laminating and other resins for composite materials to evaluate when and if mechanical stress can be applied to the material Curing and quality control of potting compounds to evaluate when a potting mold can be safely removed as well as indicating when the pot life of the potting compound is approaching.

Coagulation of milk in cheese making processes to evaluate when the curd is sufficiently coherent that it can be cut, and in making yogurt and similar products to detect the endpoint of the coagulation process.

Coagulation of blood for the purpose of monitoring effects and effectiveness of coagulation-regulating pharmaceuticals.

For each of these applications, it is important to know when the transformation process is sufficiently advanced that the material can be used for its intended function, or to monitor the effectiveness of an intervention meant to modify a transformation process of a material All of these processes depend on knowledge of the transformation behavior of the material. Each of these materials starts out as either a fluid or a paste that hardens into a rigid or rubbery mass during transformation. A typical liquid-to-solid transformation process can be broken down into three stages:

1. Initial fluid stage. The material can be made to flow, either under its own weight (typically called "self-leveling") or, when its consistency is pasty, under external stress or pressure. The latter materials can be described as having a yield stress. They are typically not self-leveling but will flow when subjected to external forces that exceed its shear strength.
2. Gelation stage. The material becomes more rigid—it can support higher shear stresses without yielding—but is still sticky and soft.
3. Cured stage. The material now has a substantial shear rigidity. It behaves more like a solid than a sticky gel.

FIG. 2, displays a chart that shows the time course of ultrasound velocity and ultrasound attenuation during cure of an unsaturated polyester resin. These quantities are related to the elastic and loss moduli, respectively. These charts were created using a prior art ultrasound measurement technique. The shear behavior of a resin, however, is completely analogous. Like the elastic modulus, the shear modulus has two components, a rigidity and a loss modulus. The rigidity modulus is the ratio of shear stress to shear strain of the material; the loss modulus is the ratio of shear strain to shear velocity. It is called the loss modulus because it describes how energy is dissipated in frictional work when the material is sheared.

To apply these concepts to the curing process:
1. During the initial fluid stage, the elastic modulus is low, and the loss modulus is low. The material is soft and has a low viscosity compared to the viscosity that develops during curing.
2. During the gelation stage, the elastic modulus is rising as the material becomes more rigid. The loss modulus rises to a maximum value as the material becomes more viscous.
3. In the cured stage, the loss modulus has decreased to near its initial value and the elastic modulus rises to a final asymptotic maximum as the material solidifies. It now behaves like a solid, with very little viscous loss.

These descriptions are simplified in that they apply to isothermal processes. In reality, both the elastic modulus and the loss modulus are temperature sensitive. In addition, many resin systems generate heat during the curing process—their curing is exothermic. Interpreting the cure data of exothermic resin can be aided by simultaneously monitoring the temperature of the curing mass.

The invention is based on the use of a measurement device (such as device 10) having a resonator of known characteristics to which a resonator extension is attached. Said characteristics—its resonant frequency and intrinsic damping are modified by the action of a curable or otherwise transformable material in which the resonator extension is wholly or partially immersed. Device 10 is used to monitor the fluid characteristics, elastic modulus and shear modulus during the process of transformation and making decisions informed by this monitoring. Since many of the curable and/or transformable materials for which the method will be used are very tenacious and adherent in their cured or even gelled conditions, it is advantageous to have a resonant measurement system with a detachable and preferably removable extension that is inexpensive enough, and easy enough to attach and remove, that it can be used once and then disposed of, without the need for cleaning off cured material.

Referring now to FIG. 3, which is a block diagram depiction of a fluid-properties measurement device 10, a transducer system 20 is housed in the body 12 (see FIG. 1a) of the device. As will be shown below, the resonator 14 is partially housed in body 12, and partially extends outwardly (distally) from body 12. The resonator extension 16 is coupled to the resonator 14, as noted above. The transducer system 20 causes resonator 14 to resonate and senses the resultant motion. Systems for performing these functions are disclosed in U.S. Pat. Nos. 5,837,885 and 8,291,750, which are incorporated by reference as if fully set forth herein. An electronic excitation and measurement system 22 is typically a computer that includes a program for alternately commanding the transducer system 20 to excite the resonator 14 and to sense the resultant resonant motion. In a preferred embodiment electronic system 22 includes a microprocessor and is resident in the body 12 of device 10. In embodiments, electronic system 22 both commands the excitation and sensing of resonator 14, also monitors the changing fluid properties of a fluid 24 that is being tested. In embodiments, system 22 compares these changing fluid properties to a target time-profile for the transformation that is taking place. By performing this repetitive comparison, system 22 can determine if the process of transformation is proceeding as it ideally should proceed and can also determine when the process is nearing completion or is complete. A user perceptible indicator is issued if the transformation differs relative to the target time-profile in a manner that the computer program of system 22 determines could be detrimental. Also, a user perceptible indicator is issued when the transformational process is either finished or approaching a finished state. In embodiments, electronic system 22 is divided between a portion that is resident in body 12 and which commands the excitation and sensing phases of transducer system 20, and an external portion that monitors the fluid properties of fluid 24 over time and that has stored a library of target time-profiles of various materials under various ambient conditions. The external portion may be a laptop computer connected, for example by a USB cable to device 10 (equipped with a USB port). In another embodiment the connection between the external portion of system 22 and device 10 is wireless.

Figure 4B:
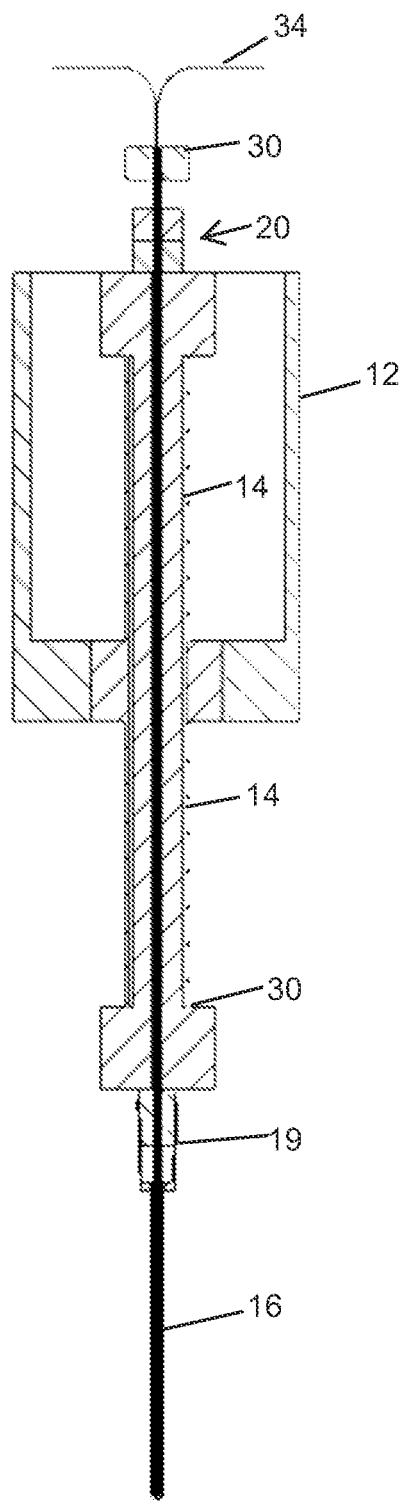
FIG. 4b is a sectional view of the fluid-properties measurement device of FIG. 1.
Figure 4A:
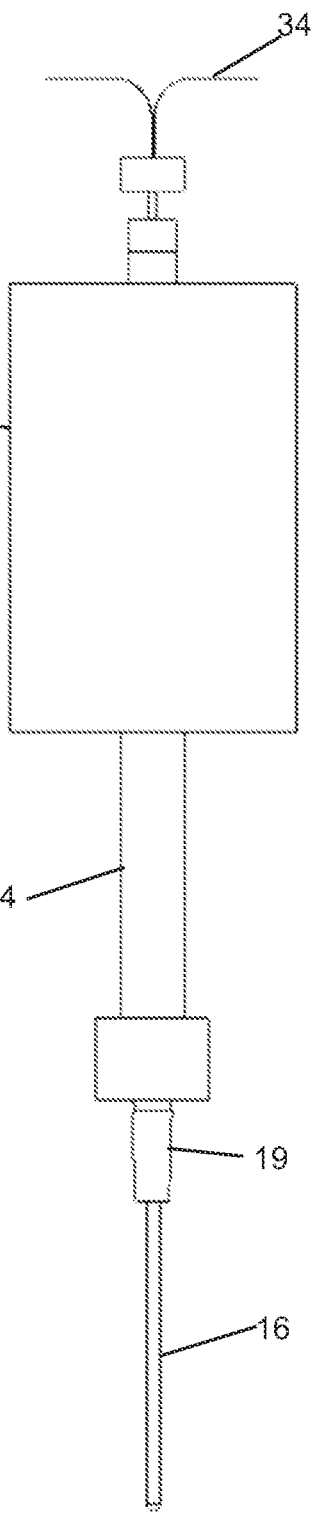
FIG. 4a is a side view of the fluid-properties measurement device of FIG. 1, showing some additional detail.
Figure 5:
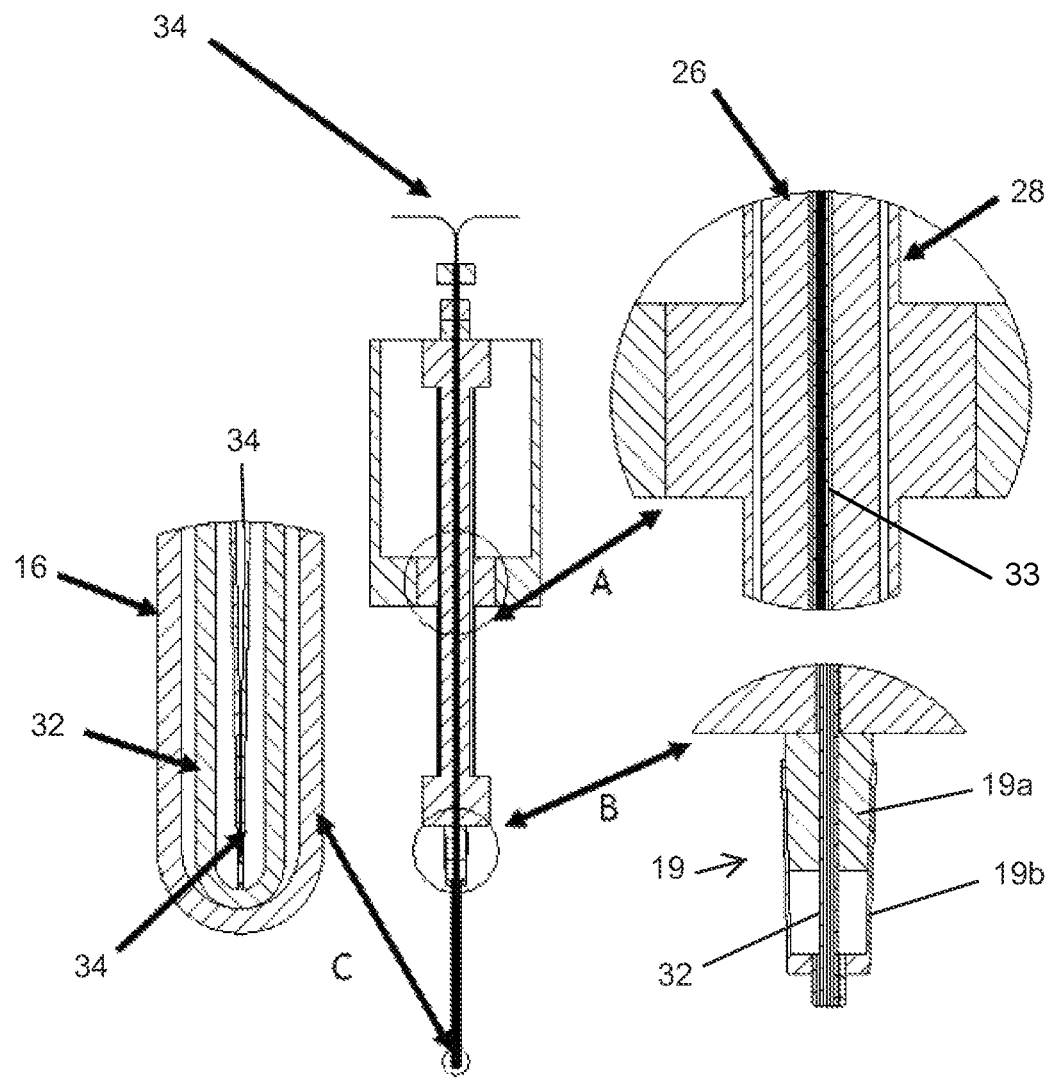
FIG. 5 is the sectional view of FIG. 4b, with detail views included and each indicated by an arrow, A, B or C.

Referring now to FIGS. 4a, 4b and 5, device 10 includes resonator 14, which in embodiments is a torsional symmetric coaxial resonator of the type disclosed in U.S. Pat. No. 9,267,872. As resonator 14 is vibrationally symmetric it is therefore relatively insensitive to mounting losses. The resonator is provided with a torsional transducer 20 that produces a torque on the free end of the resonator 14, as well as measuring torsional motion of the same free end. The torsional resonator 14 has an axial channel of typically 1 mm diameter. Resonator 14 includes an inner drive rod 26, enclosed in an outer tube 28 that is coupled to the body 12 at its midpoint, thereby permitting a freer torsional rotation or oscillation of inner drive rod 26. The distal end of the resonator 14 is fitted with a male Luer taper adapter 19*a* (FIG. 5). The adapter is constructed such that its moment of inertia about its central axis maintains the balanced condition of the resonator.

Referring to FIG. 5, a thermometer probe 30, a preferred embodiment of which consists of a slender stainless steel tube 3, preferably with a diameter of 0.7 mm or less, which after the resonator extension is attached, is extended through and out of the axial channel 33 of resonator 14 and extension 16 to abut the interior surface of the tip of the extension 16. Two fine-gauge insulated thermocouple wires 34 extend through and are attached to the interior of the distal tip of tube 32. The thermocouple wires constitute the two legs of a standard thermocouple pair, for instance of a type known as Chromel-Alumel, or type K thermocouple, although other pairings are also appropriate. At the distal end of the sensor, the two wires are welded into the tip of the stainless steel tube 32, while the proximal end of the probe is fitted with a suitable terminal means allowing connection of the probe to a suitable electronic temperature measurement circuit, not further described here. A thermometer probe of these dimensions permits rapid response to changes in the temperature at the distal tip of the extension 16, while exerting minimal influence on the vibrational characteristics of the resonator, that is, its resonant frequency and damping.

Resonator extension 16 may be a disposable hypodermic or dosing needle having a plastic Luer hub 19*b* (FIG. 5) at its proximal end, by which it can be attached to the distal Luer taper adapter 19 of the resonator 14. In embodiments, needle style resonator adapter 16 is welded shut at its distal end, for instance with a laser welder. This serves the purpose of sealing the needle against fluid ingress which helps to define the wetted surface area of the tip. It also provides a stop for the optionally inserted thermometer probe.

Figures 6A, 6B:
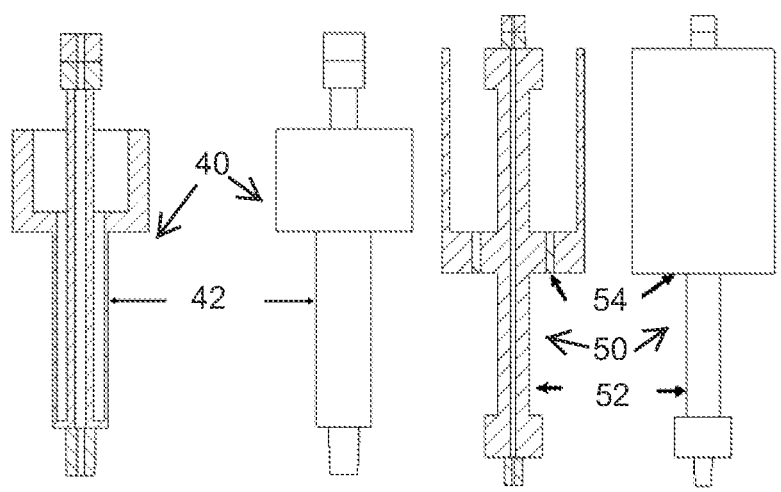
FIG. 6a is an alternative embodiment of a fluid-properties measurement device, according to the present invention.
FIG. 6b is an additional alternative embodiment of a fluid-properties measurement device, according to the present invention.
Figures 7A, 7B, 7C:
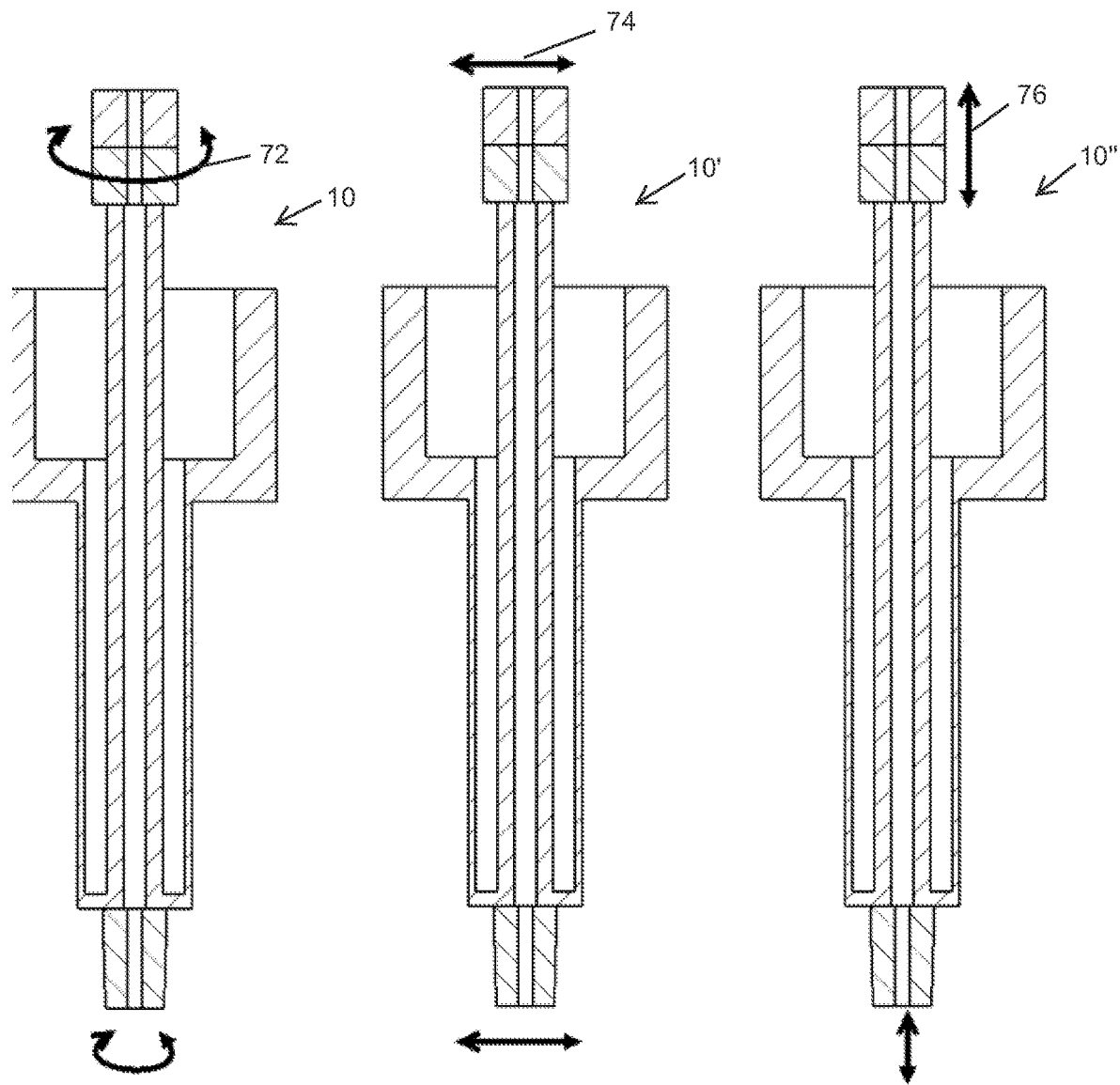
FIG. 7a is a sectional view of the fluid-properties measurement device of FIG. 1, but not showing the resonator extension, and indicating a possible direction of resonant movement.
FIG. 7b is a sectional view of the fluid-properties measurement device of FIG. 1, but not showing the resonator extension, and indicating an alternative possible direction of resonant movement.
FIG. 7c is a sectional view of the fluid-properties measurement device of FIG. 1, but not showing the resonator extension, and indicating an additional alternative possible direction of resonant movement.

Referring to FIG. 6 in addition to device 10, a device 40 may be used, which has a re-entrant coaxial resonator 42. Also, useable is a device 50 having a solid dumbbell resonator 52 connected to the body with an elastomer spacing 54. By providing these resonators 14, 42 and 52 with a standard interface (in this case, a Luer taper), any extension tip provided with a mating Luer taper can be combined with the resonator. FIGS. 7*a*-7*c* illustrate that a device 10 may have a resonator 14 may be driven in torsion as shown by arrow 72 in FIG. 7*a* and as described above, or in transverse motion as shown by arrow 74 for device 10' of FIG. 7*b* or in longitudinal motion as shown by arrow 76 for device 10" in FIG. 7*c*.

Referring now to FIGS. 8*a*-8*c*, a resonator extension may be of a rod or tube type as shown in FIG. 8*a*, a rod or tube with a bob as shown in FIG. 8*b* or a leaf spring having constant width or varying, shaped width as shown in FIG. 8*c*.

Although a preferred embodiment uses electromagnetic torsional transducers to excite and measure torsional motion of the resonator, other transducer means include but are not limited to:

Other electromagnetic transducers, any one of which can be adapted to any of the vibrational modes: torsional, transverse and longitudinal.
  i. Operating through Lorentz forces
  ii. Operating as variable reluctance transducers
  iii. Operating through eddy current action (so called EMATS transducers)
  b. Piezoelectric transducers, capable being adapted to any of the vibrational modes cited above.
  c. Optical sensors for measuring torsional, lateral, or longitudinal displacements of the sensor, when excited by an excitation transducer, selected from but not limited to those disclosed in this invention.
  d. Combinations of any of these transducers with one another, for instance, piezoelectric excitation combined with electromagnetic sensing.
  e. Although a preferred embodiment uses a thermocouple temperature probe, other temperature sensors may be used, including but not limited to NTC and PTC thermistors, resistance thermometers such as Pt100 or Pt1000 sensors, or semiconductor temperature sensors. Thermocouples are preferred because they can be readily fabricated in very small diameters to fit through the central channel of the resonators but use of larger-dimensioned resonators would also permit the use of other temperature measurement means.

METHODS OF MONITORING PHYSICAL TRANSFORMATION: The functioning of the cure monitoring sensor is best understood by considering the functioning of the resonator, and then superimposing the added effect of the resonator extension that is initially wetted by the uncured material to be monitored. The functioning of the sensor will be illustrated using the preferred embodiment described above but is understood to be similar for all other embodiments as summarized in the previous section.

The symmetrical resonator used in the preferred embodiment has been described in U.S. Pat. No. 9,267,872. It behaves as a damped mass-spring system, its damping being affected primarily by the material in which it is immersed. The resonator in the preferred embodiment oscillates torsionally at a frequency of approximately 7.5 kHz. This frequency is significant because it prescribes the characteristics of a preferred resonator extension for monitoring resin cure. Other frequencies are also useable, for any of a broad range of materials and measurement types.

A cylindrical body attached coaxially to a torsional resonator behaves either as an additional rigid mass or as a second resonator depending on the wavelength of torsional waves induced in the attached cylinder. If the modulus of rigidity of the cylinder is G, and its density is ρ, then the speed of torsional waves in the cylinder is given by $U=\sqrt{G/\rho}$. For stainless steel, $G=70.3$ kN/mm$^2$, and $\rho=8\times10-6$ kg/mm$^3$. This gives a torsional wave speed of approximately 3,000 m/s. The wavelength of torsional waves at this frequency is given by $L=U/F=3,000/7500=0.4$ m. The first torsional resonance of a needle clamped at one end and free at the other occurs when its length is ¼ of the wavelength of torsional waves in the needle. At 7500 Hz. L/4=0.1, or 100 mm. The shorter the needle, the closer it comes to being simply an additional mass attached to the main mass at the fluid end of the resonator. Empirically, it has been found that needles with a length of 38 mm, or 1.5 inches, behave substantially as a rigid mass attached to the resonator.

As long as the curable material in which the resonator extension is submerged is substantially liquid, as when it is first mixed but before gelation has begun, the resonator is damped because of viscous forces exerted by the fluid on the resonator extension which, behaving as a substantially rigid body, transmits these forces to the resonator. At the end of the curing process, however, the free end of the extension is essentially clamped by the resin, forcing its displacement to be substantially zero, at which point the extension acts like a spring in parallel with the elasticity of the resonator. Since there is substantially no motion of the free end, viscous forces are not generated, so there is very little energy dissipated in the resin. The net effect is that the resonator's damping is reduced to nearly the value it had prior to being immersed in the resin, but the added elastic forces raise the resonant frequency of the resonator. This may be interpreted as a sort of signature of hardening, and process completion, of the substance being monitored.

Between these two endpoints, the damping of the resonator rises as the material becomes more viscous, while the frequency also rises because the material is becoming more rigid. The damping reaches a maximum value and begins to fall as the curing proceeds. As curing proceeds, the material becomes more rigid, making the extension act more like a spring, and increasing the frequency of the resonator.

The curing process has two identifiable phases:
1. Gelation. At the beginning of the gelation process, the resin is liquid, in which the main forces on the resonator extension are viscous. As the curing process proceeds, the viscosity of the resin rises, causing the resonator to be progressively more damped. At the end of the gelation phase, the resin is a sticky gelatinous mass, a gel. In the gelled state, its viscous and elastic behaviors are more or less equal. The end of gelation process is associated with a maximum in the damping vs. time curve.
2. Curing. The gelled mass begins to solidify. It becomes more rigid, and less viscous. The damping of the resonator is now decreasing, as its frequency increases. When the curing process is complete, the frequency of the resonator is relatively constant, and the damping has decreased to near its value before it was immersed in the resin.

Although this functional description is based on the torsional behavior of a preferred resonator embodiment, similar considerations apply to resonators driven in transverse and longitudinal mode. The formula for wave speed in the resonator extension gives guidance for dimensioning resonator extensions that behave as rigid bodies in fluids, and springs when clamped at their distal end. Other formulas apply for these other vibrational modes, and depending on the resonant frequency of the resonator to which they are appended.

Device 10 is based on a Rheonics SRV viscosity sensor with a Luer taper on its tip to permit connecting a conventional disposable dosing needle to extend its sensitive element. By using a disposable extension, the sensor itself is not exposed to the adhesive; the needle can simply be detached and disposed of along with the gelled or hardened material.

In one embodiment device 10 outputs two numbers: the damping and the frequency of the instrument's resonator. The damping is primarily dependent on the viscosity of the material, while the frequency depends primarily on its rigidity. The output of the CureTrack therefore gives a snapshot of the viscoelastic behavior of the material as it goes through its gelation and curing processes.

Figure 9:
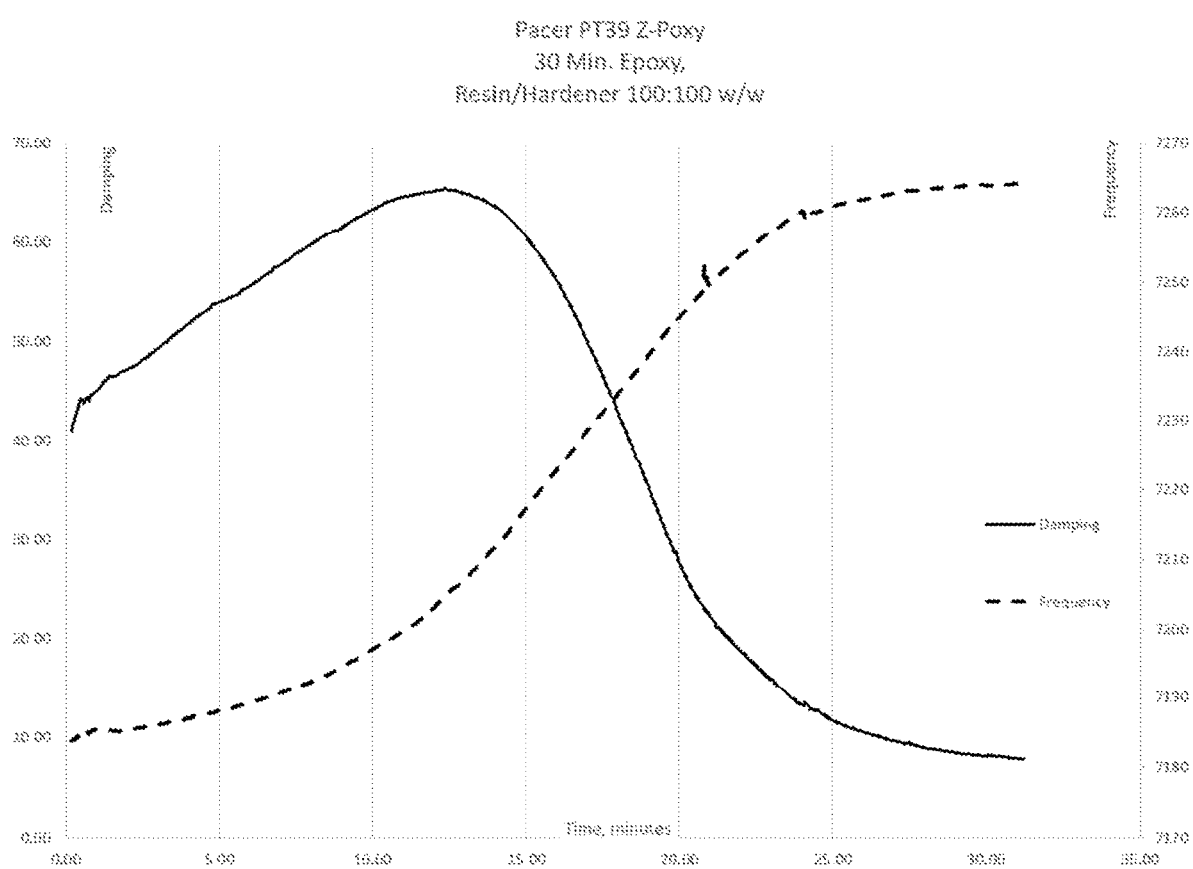
FIG. 9 is a graph showing a pair of curves showing damping and frequency over time for fast-curing consumer epoxy resin and hardener mix, as measured by a fluid properties measurement device according to the present invention.
Figure 10:
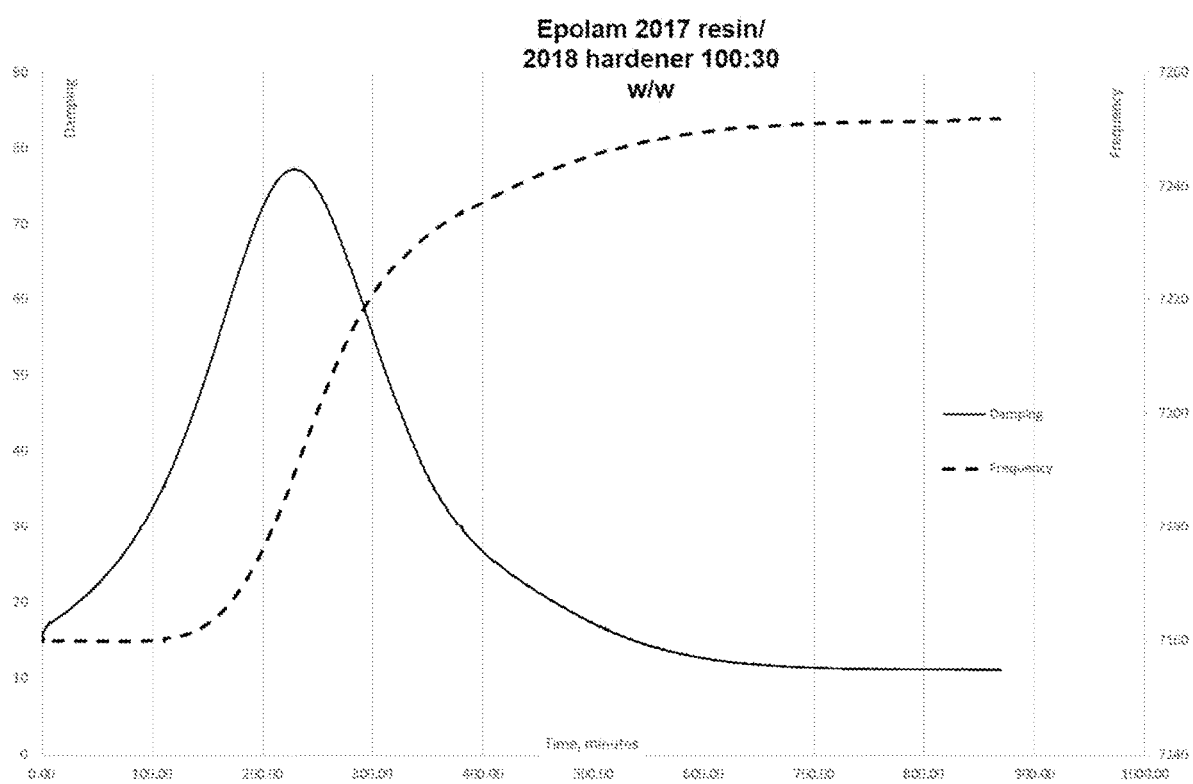
FIG. 10 is a graph showing a pair of curves showing damping and frequency over time for a slow-curing composite laminating epoxy, as measured by a fluid properties measurement device according to the present invention.
Figure 11:
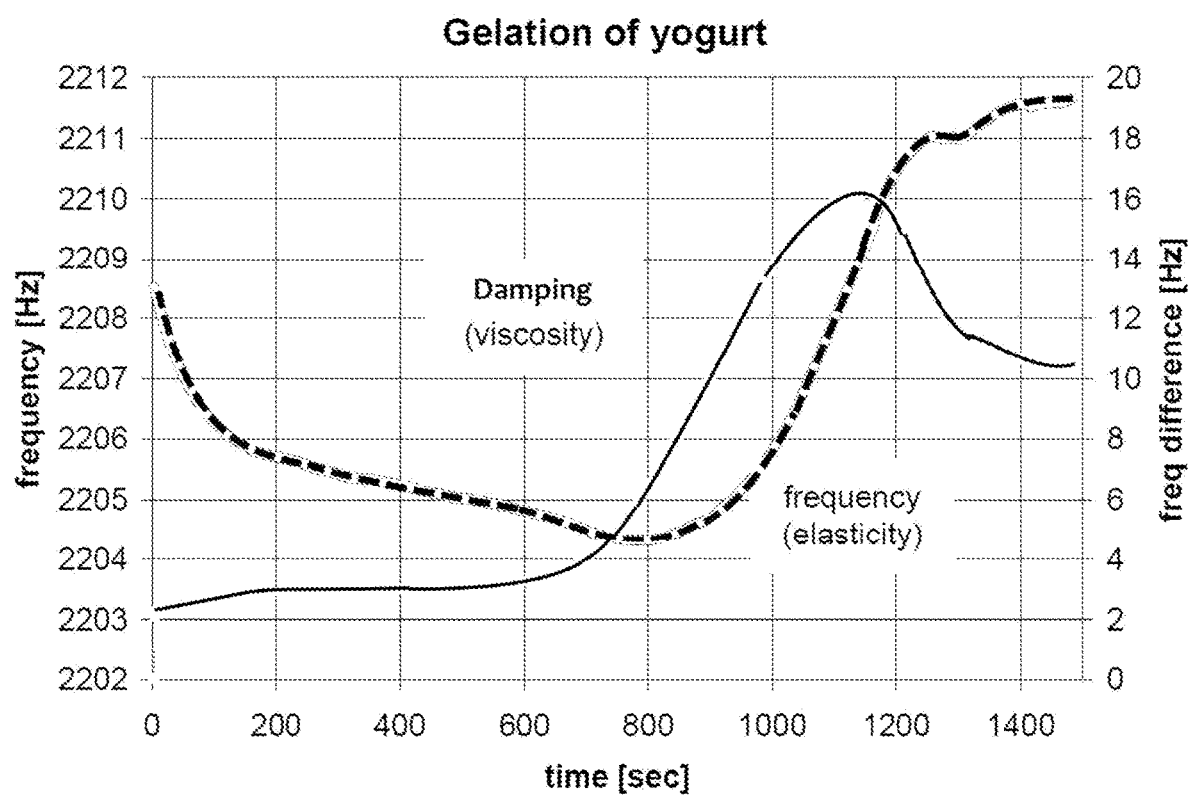
FIG. 11 is a graph showing a pair of curves showing frequency difference (related to viscosity) and frequency (related to elasticity) over time, for yogurt undergoing fermentation.

FIGS. 9 and 10 show the curing curves of two different epoxy systems, as recorded by device 10. The first is a consumer epoxy adhesive with a thiol-based hardener, Pacer Technology PT39 Z-Poxy 30 Minute Epoxy. This is specified as having a 30 minute cure time. and is commonly sold in hobby shops for model building. The second is Axson Epolam 2017 resin with Epolam 2018 hardener, an amine-curing system used for wet layup laminated composites. The rated gelation time is 6 hours at a resin/hardener weight ratio of 100:30 at 23° C. in a lamination process, in which the large surface area restricts exothermal heating and acceleration of the curing process Those skilled in the art will readily recognize the advantage of the apparatuses and methods described above. By having an inexpensive resonator extension 16, the need for cleaning any part of the resonator 14 is largely eliminated. Moreover, for food processing, sterile packaged extensions 16 may be provided. For liquids that cure into adhesives, extension 16 may be detached from device 10 and left behind in a small portion of the adhesive or detached from device 10 and then pried free from the hardened resin mass without damaging resonator 14, or device 10. The range of applications of fluid property measurement devices is thereby broadened, permitting improved monitoring of industrial processes.

The disclosed embodiments are illustrative, not restrictive. While specific configurations of the fluid measurement technology have been described, it is understood that the present invention can be applied to a wide variety of fluid measurement technology. There are many alternative ways of implementing the invention.

What is claimed is:

1. A method for measuring fluid properties of a sequence of fluids, including at least a first fluid and a second fluid, comprising:
    a) providing a monitoring assembly, comprising a fluid-properties measurement device that includes a resonator, and a set of resonator extensions, each one adapted to attach to said resonator in a manner such that said resonator's response to excitation is affected by immersion of said resonator extension;
    b) attaching a first one of said resonator extensions to said resonator;
    c) using said fluid-properties measurement device to measure at least one fluid property of said first fluid;
    d) removing said first one of said resonator extensions from said resonator;
    e) attaching a second one of said resonator extensions to said resonator;
    f) using said fluid-properties measurement device to measure at least one fluid property of said second fluid.

2. The method of claim 1, wherein said sequence of fluids includes additional fluids and wherein, after every use of said fluid-properties measurement device said resonator extension is removed from said resonator and a new, unused, or functionally refurbished resonator extension is attached to said resonator.

3. The method of claim 1, wherein said resonator extensions are kept in individual sterile packages prior to use.

4. The method of claim 1, wherein said first one of said resonator extensions is identical to said second one of said resonator extensions.

5. The method of claim 1, wherein said first one of said resonator extensions is shaped differently from said second one of said resonator extensions.

6. The method of claim 1, wherein said first fluid is substantially identical in composition to said second fluid.

7. The method of claim 1, wherein said first fluid and said second fluid are substantially mutually distinguished in composition.

8. The method of claim 1, wherein each said resonator extension is disposed of after use.

9. A method of monitoring a physical transformation of a fluid, comprising:
    a) providing a fluid-properties measurement device, having an outwardly projecting resonator assembly having a proximal end and a distal end and having enough resilient deformability so that said proximal end resonates when said distal end is substantially stationary, due to said transformation of said fluid into an at least partially solid material, and which, when in use, produces fluid property readings, said outwardly projecting resonator assembly acting as a spring in such a condition;

b) introducing said outwardly projecting resonator assembly into said fluid contemporaneously to onset of said physical transformation; and c) monitoring said fluid property readings during said physical transformation.

10. The method of claim 9, further including providing a computer communicatively coupled to said fluid-properties measurement device, and wherein said step of monitoring is automatically performed by said computer.

11. The method of claim 10, wherein said computer includes non-transitory memory which has a data set and a program, and wherein said program compares said readings to said data set.

12. The method of claim 11, wherein said data set includes a single data point, indicating a fluid property that indicates that the process has reached a stage at least close to transformation completion, and wherein said computer provides a user-perceptible indication when a reading that matches or exceeds said data point has been received.

13. The method of claim 11, wherein said data set includes a target time-profile for said readings of said physical transformation and wherein said readings are compared to said target time-profile.

14. The method of claim 13, wherein a user perceptible indication is given when said readings differ from said target time-profile by greater than a set amount.

15. The method of claim 13, wherein said fluid is in an environment controlled by adjustable equipment during said physical transformation, and wherein said computer is communicatively coupled to said adjustable equipment, and wherein when said computer program determines that said physical transformation is differing from said target time-profile in a manner that warrants environmental adjustment, said computer adjusts said equipment to change said environment of said fluid.

16. The method of claim 9, wherein said computer is in the form of a microcomputer that is physically within a housing of said fluid-properties measurement device.

17. The method of claim 9, wherein in a final stage said fluid solidifies, so that although said immersed distal end does not move, said proximal end resonates, permitting further readings and a detection of fluid hardening.

* * * * *